United States Patent

Moyer et al.

[15] 3,663,374
[45] May 16, 1972

[54] METHOD AND APPARATUS FOR QUANTITATING ENZYME ACTIVITY

[72] Inventors: Rudolph H. Moyer, West Covina; Donald J. Sibbett, Cucamonga, both of Calif.

[73] Assignee: Geomet, Incorporated, Rockville, Md.

[22] Filed: Aug. 14, 1970

[21] Appl. No.: 63,842

[52] U.S. Cl. ..................................195/103.5 R, 195/99
[51] Int. Cl. .........................................................G01n 31/14
[58] Field of Search............195/103.5, 99; 23/253 TP, 230 B, 23/10

[56] References Cited

UNITED STATES PATENTS

| | | | |
|---|---|---|---|
| 3,526,480 | 9/1970 | Findl et al. | 23/253 TP X |
| 3,367,841 | 2/1968 | Buissiere et al. | 195/103.5 R |
| 3,261,668 | 7/1966 | Natelson | 23/253 TP |

*Primary Examiner*—A. Louis Monacell
*Assistant Examiner*—Max D. Hensley
*Attorney*—David H. Semmes

[57] ABSTRACT

Method and apparatus for quantitating enzyme activity in blood and other fluids, using a spot test technique. The test utilizes enzyme standards freeze-dried in absorbent discs held under a membrane filter. Other discs above the filter contain substrate, cofactors, and indicators. The spot test plates are entirely self-contained, requiring neither instrumentation nor measurement of fluid volumes, and the test can be carried out under any ambient conditions. The test is particularly applicable to emergency screening requirements, such as may occur in hospital receiving rooms, doctors' offices, ambulances, or whereever rapid diagnosis of myocardial infraction may be required.

10 Claims, 1 Drawing Figure

Patented May 16, 1972
3,663,374
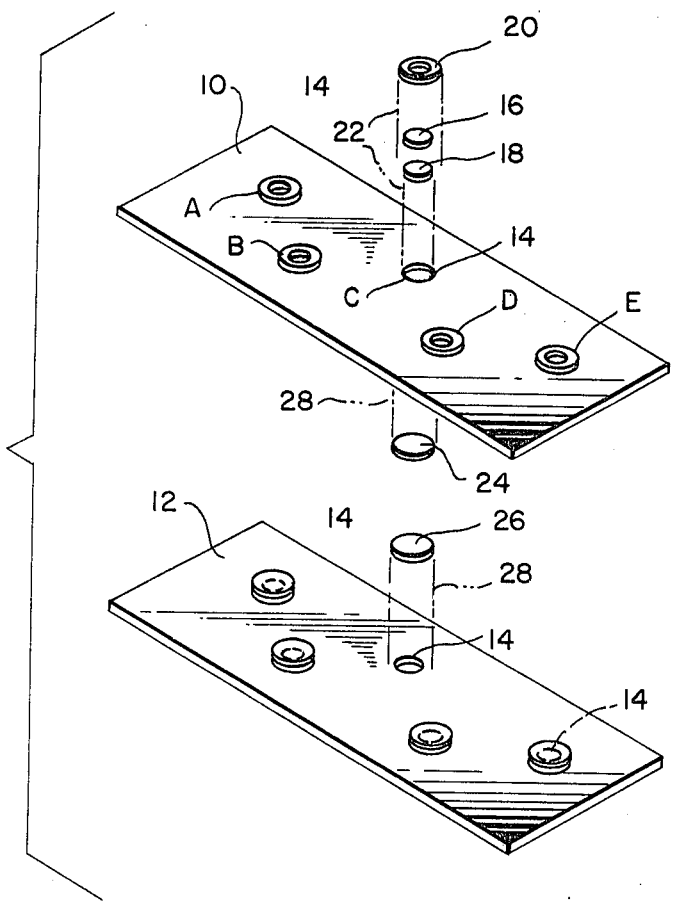
INVENTORS
RUDOLPH H. MOYER
DONALD J. SIBBETT
ATTORNEY

METHOD AND APPARATUS FOR QUANTITATING ENZYME ACTIVITY

BACKGROUND OF THE INVENTION

The use of blood enzymes for diagnosis of various pathological conditions is such standard clinical practice that test kits and automated procedures are available for assay of most enzymes of interest. Myocardial infarction is one of the conditions either diagnosed or verified through measurement of the level of activity of several enzymes which escape into the bloodstream through damage to the myocardium.

Activity measurements of a combination of five enzymes are commonly employed for such diagnoses, and elevated levels of any of the following in blood serum may be indicative of myocardial infarction:

Creatine phosphokinase (CPK)
Lactate dehydrogenase (LDH)
α-hydroxybutyrate dehydrogenase (HBD)
Glutamic-oxalacetic transaminase (GOT)
Glutamic-pyruvic transaminase (GPT)

The activity of these enzymes in serum is usually determined by a procedure in which a product of the reaction is linked to the oxidation or reduction of nicotinamide-adenine dinucleotide, a process which can be followed spectrophotometrically. Commercially available reagent kits for assay of most of these enzymes require only the addition of a small quantity of blood serum and brief preincubation prior to spectrophotometric determination of reaction rate. While the kits are convenient for use in a clinical laboratory, they require temperature control, the use of serum or plasma rather than whole blood, and the availability of a spectrophotometer. Because of these requirements, the usual tests are not well-suited for use in emergency situations, where the necessary instrumentation and trained personnel may not be readily available.

SUMMARY OF THE INVENTION

The method and apparatus utilize a simple spot test procedure in which the rate of color development on reference spots, containing pre-standardized increments of enzyme, is compared directly with that on a test spot where the enzyme extracted from blood reacts. Direct comparison of the blood with reference spots eliminates the need for both temperature control and timing of reaction rates. The test measures enzyme activity of whole blood, and it therefore requires neither instrumentation or operator skill. It can, therefore, be employed for rapid screening in emergency situations where clinical test equipment and trained personnel may not be available.

An illustrative embodiment of the apparatus and a working embodiment of a practical method will be explained with reference to the accompanying drawing in which the single figure is:

An expanded view of a test screening plate and components utilized therewith.

In one form of the screening test a plate format is used, as shown in the drawing. This test measures the activity of creatine phosphokinase (CPK), a preferred indicator enzyme for early diagnosis of myocardial infarction. The test is based on a reaction sequence which links adenosine triphosphate (ATP), a product of the CPK reaction to reduction of nitro blue tetrazoleum for visualization of the extent of reaction in a given time interval. All reagents, along with the CPK standards, are freeze-dried in discs of absorbent material which are held between two matching polystyrene slides or plates as will be described in detail hereinafter with reference to the drawings.

The reagent system is similar to that routinely employed for CPK assay and is coupled to reduction of nitro blue tetrazoleum through the electron carrier, N-methylphenazonium methosulfate. Concentrations of reagents are adjusted to provide optimum reaction conditions when the freeze-dried components are reconstituted by wetting the discs. The following reagents and concentrations, described in appropriate literature, Nielsen, L. and Ludvigsen, B., J. Lab & Clin. Med., 62, 195–168 (1963), and Rosalki, S.B., Nature, 207, 414 (1965), were selected as being appropriate.

| Reagents | Concentration (mg./ml.) |
|---|---|
| Cysteine hydrochloride | 1.0 |
| Adenosine diphosphate (ADP) | 1.0 |
| Nicotinamide adenine dinucleotide phosphate (NADP) | 1.0 |
| Glucose | 3.0 |
| Adenosine-5'-monophosphate (AMP) | 4.0 |
| Nitro blue tetrazoleum (NBT) | 1.0 |
| Creatine phosphate (CP) | 5.0 |
| Magnesium acetate | 2.0 |
| N-methylphenazonium methosulfate (PMS) | 0.1 |
| Hexokinase (Hex) | 0.1 IU |
| Glucose-6-phosphate, dehydrogenase (G-6-P deH) | 5.0 IU |
| Creatine phosphokinase (CPK) | As required |

These reagents, except cystein hydrochloride, are dissolved in glycyl-glycine buffer, adjusted to pH 6.8 and appropriately distributed on discs incorporated in the test apparatus structures for effecting the testing.

An enzyme screening plate for practicing the invention is shown in expanded or exploded view in the FIGURE and consists of upper slide 10 and lower slide 12 of appropriate material such as the usual laboratory polystyrene. Each of the slides has a plurality of openings or holes 14 therethrough, in the disclosed structure being five in number for purposes hereinafter to be described. Glass fiber discs 16 and 18 are adapted for sandwiching placement over the openings and held thereon by means of a retaining ring 20 of suitable material and in an appropriate manner. The relative sizes of the glass fiber discs 16, 18 and retaining ring 20, with respect to the hole 14 are indicated by appropriately placed dashed lines at 22. Intermediate the slides 10 and 12, and accordingly beneath the opening 14 in upper slide 10 and above hold 14 in the lower slide 12, adapted for sandwiched positionment, are a membrane filter 24 and a cellulose acetate disc 26, the size thereof relative to the holes 14 being indicated by broken lines at 28. The relative sizes permit positioning and retaining of these various aforesaid discs in conjunction with the retaining ring 20.

The distribution of the reagents referred to above on the various discs is as follows:

16 — Upper glass fiber — cysteine hydrochloride
18 — Lower glass fiber — composite of all except PMS and enzymes
24 — Membrane filter — PMS
26 — Cellulose acetate — CPK, Hex, G-6-P deH This separation of mutually incompatible reagents provides maximum storage stability and test reliability.

The glass fiber discs, besides serving as a reagent reservoir, remove white blood cells to prevent clogging of the membrane filter which removes red cells and other particles. Thus, a drop of blood placed on the upper glass fiber disc 16, takes up cysteine hydrochloride, reagents from the lower disc 18, and PMS from the membrane filter 24, delivering both filtered plasma and reagents to the enzymes on the cellulose acetate 26 where the reaction takes place.

In practice, the reagents are applied as indicated above and freeze-dried. The two slides are then sealed together, packaged, and stored. In the preferred configuration, five sets of discs are used to provide five test spots. Spots A, B, and C contain CPK standards representing normal, elevated, and high enzyme levels, respectively. Spot D is a blank and contains all reagents except creatine phosphate. Spot E is for assay of CPK and contains reagents for the complete reaction sequence. Obviously any desired arrangement or selection of spots can be used.

In use, the slide is positioned with the retaining ring and glass fiber discs uppermost. A drop of water is applied to spots A, B, and C, a drop of whole blood to each of D and E. Since fluid uptake is governed by the absorbency of the discs, the volume applied to each spot is of no importance. The slide is then inverted and the development of blue color observed. After a few minutes, the intensity of color in spot E is compared with the standards as indicated at spots A, B, and C for a direct reading of CPK activity.

Slides prepared as described above, and employed to discriminate between normal and elevated blood CPK give results which indicate that in use:
1. Operator skill is not a necessity.
2. Whole blood can be used directly.
3. The test clearly discriminates between normal and elevated CPK levels.
4. Auxiliary instrumentation is not required.
5. Measurement of fluid volumes is unnecessary.
6. Internal standards eliminate the need for both temperature control and timing of the reaction.

Accordingly, the spot test in accordance with the invention is a useful tool for screening patients for myocardial infarction in emergency situations.

This system may also be utilized for screening the blood for elevated levels of other enzymes which are released into the blood during myocardial infarction: lactate dehydrogenase, α-hydroxybutyrate dehydrogenase, glutamic-oxalacetic transaminase, and glutamic-pyruvic transaminase. Appropriate modifications of the reagent system contained in the plate assembly is required in these cases.

Manifestly minor changes in the structure and test procedure can be effected without departing from the spirit and scope of the invention as defined in and limited solely by the appended claims.

We claim:
1. In a system for quantitating enzyme activity in whole blood:
   A. means defining a plurality of separate restricted test zone areas in a rigid array;
   B. said areas including in a rigidly confined-stacked array a plurality of superposed test reagent impregnated members in a rigidly confined column and adapted for placement on a said column of a fluid test media, said stacked array including in descending sequence:
      i. a porous upper glass fiber disc;
      ii. a porous lower glass fiber disc;
      iii. a membrane filter disc; and
      iv. a cellulose acetate disc;
   C. said porous glass fiber discs constituting prefilters to remove amorphous matter including white cells from blood to prevent such matter from subsequently clogging pores of said membrane;
   D. said porous discs constituting dried reagent storage units for elution therefrom by clear filtrate passing through the prefilter disc combination;
   E. said membrane filter disc constituting a red blood cell and particle removal unit from a test specimen;
   F. said porous discs constituting fluid volume control units; and
   G. test reagents incorporated in selected ones of said discs and membrane in said stacked arrays constituting said separate restricted test zone areas, operable upon application of whole blood and preset controls thereto to visually color indicate the enzyme activity in the whole blood.

2. In a system as claimed in claim 1, superposed slides mounting said stacked discs therebetween, said slides being sealed together and constituting prefabricated test packages.

3. In a system as claimed in claim 2, said discs severally having selected mutually incompatible in storage reagents required for a given test impregnated on separate said discs, said reagents contained in said discs being freeze-dried for separation and storage prior to test use.

4. In a system as claimed in claim 3, said upper glass fiber disc containing Cysteine hydrochloride, said lower glass fiber disc containing a composite of reagents required for a Creatine phosphokinase assay excluding N-methylphenazonium methosulfate and enzymes, said membrane filter disc containing N-methylphenazonium methosulfate, and said cellulose acetate disc containing Creatine phosphokinase, Hexokinase and Glucose-6-phosphate dehydrogenase.

5. In a system as claimed in claim 4, said composite of reagents comprising in concentration (mg./ml.):

| Reagents | Concentration (mg./ml.) |
| --- | --- |
| Cystein hydrochloride | 1.0 |
| Adenosine diphosphate | 1.0 |
| Nicotinamide adenine dinucleotide phosphate | 1.0 |
| Glucose | 3.0 |
| Adenosine-5'-monophosphate | 4.0 |
| Nitro blue tetrazoleum | 1.0 |
| Creatine phosphate | 5.0 |
| Magnesium acetate | 2.0 |
| N-Methylphenazonium methosulfate | 0.1 |
| Hexokinase | 0.1 IU |
| Glucose-6-phosphate dehydrogenase | 5.0 IU |
| Creatine phosphokinase | 5.0 IU; | and said reagents excluding Cysteine hydrochloride, being dissolved in glycylglycine buffer, adjusted to pH 6.8.

6. In a system as claimed in claim 5, a blood test specimen placed on said upper glass fiber disc in a reagent containing array taking up cysteine hydrochloride, reagents from said lower glass fiber disc, and N-methylphenazonium methosulfate from said membrane filter disc, delivering both filtered plasma and reagents to the enzymes on said cellulose fiber disc where the reaction takes place.

7. In a system as claimed in claim 5, each said area including a said stacked array, each said area comprising a spot, three said spots containing CPK standards representing normal, elevated, and high enzyme levels, respectively, a fourth said spot being a blank containing all reagents except creatine phosphate and the fifth said spot being adapted for assay of CPK and containing reagents for a complete reaction sequence.

8. In a method for quantitating enzyme activity in a system as claimed in claim 7, applying a drop of water to the upper sides of said three standards containing spots, applying a drop of whole blood to the upper sides of said fourth and fifth spots, inverting the slides mounting said stacked arrays constituting said spots, observing development of color and comparing intensity of color developed in said fifth spot with that in said three standards containing spots for a direct reading of CPK activity.

9. An enzyme CPK assay test unit for visual determination of enzyme content of whole blood comprising:
   A. a support;
   B. means constituting a plurality of test spots mounted on said support:
      i. at least first ones of said spots containing reagents for assay of CPK activity in blood serum including standards representing normal, elevated, and high enzyme levels;
      ii. an additional said spot being a blank containing all reagents in the first said spots except creatine phosphate; and
      iii. a further said spot containing reagents activatable by whole blood for a complete reaction sequence;
      iv. said reagents being mutually incompatible in storage and separated by impregnation on a plurality of discrete separate laminae which collectively constitute each said spot;
      v. said laminae in each said spot being in a rigidly confined stacked array and some said laminae constituting prefilters to remove amorphous matter including white cells from blood to prevent such matter from subsequently clogging pores of others of said laminae in a said stacked array.

10. A test unit as claimed in claim 9, said reagents being severally applied to discs constituting said laminae forming said spots to separate reagents incompatible in storage and being in a freeze-dried storage condition, the reagents in the first said spots being activated by water, activation of reagents in all said spots presenting an indicating color therein whereby enzyme content in whole blood is visually determinable by color comparison with the colors of the standard indicators.

* * * * *